US009765484B2

United States Patent
Wang et al.

(10) Patent No.: US 9,765,484 B2
(45) Date of Patent: Sep. 19, 2017

(54) METHOD FOR PREPARING A PULP MOLDED CUP LID WITH BUCKLES WITHOUT OVERLAPPING CURVES ON BOTH SURFACES

(71) Applicants: Jinhua Gaoyuan Mould & Machinery Co., Ltd, Jinhua, Zhejiang (CN); Gaoyuan Wang, Jinhua, Zhejiang (CN); Yingqi Jia, Jinhua, Zhejiang (CN)

(72) Inventors: Gaoyuan Wang, Zhejiang (CN); Yingqi Jia, Zhejiang (CN)

(73) Assignees: Jinhua Gaoyuan Mould & Machinery Co., Ltd, Jinhua (CN); Gaoyuan Wang, Jinhua (CN); Yingqi Jia, Jinhua (CN)

( * ) Notice: Subject to any disclaimer, the term of this patent is extended or adjusted under 35 U.S.C. 154(b) by 0 days.

(21) Appl. No.: 15/205,057

(22) Filed: Jul. 8, 2016

(65) Prior Publication Data

US 2016/0319490 A1    Nov. 3, 2016

Related U.S. Application Data

(63) Continuation-in-part of application No. 13/970,588, filed on Aug. 19, 2013, now abandoned.

(30) Foreign Application Priority Data

Aug. 17, 2012  (CN) ...................... 2012 2 0410099 U
Jan. 16, 2013  (CN) .................. PCT/CN2013/070512

(51) Int. Cl.
*D21J 7/00*  (2006.01)
*D21J 5/00*  (2006.01)
*B65D 43/02*  (2006.01)

(52) U.S. Cl.
CPC ............ *D21J 7/00* (2013.01); *B65D 43/0212* (2013.01); *D21J 5/00* (2013.01);
(Continued)

(58) Field of Classification Search
CPC ........ D21J 7/00; D21J 3/00; D21J 3/10; D21J 3/12; D21J 5/00; B65D 2543/00046;
(Continued)

(56) References Cited

U.S. PATENT DOCUMENTS 6,576,089 B1 *   6/2003   Sato ......................... D21J 3/10
                                                                  162/227
7,370,788 B1 *   5/2008   Otani ................... B65D 1/0207
                                                                  229/406

(Continued)

FOREIGN PATENT DOCUMENTS

CN    EP 2757194 A2 *  7/2014  ......... B65D 43/2012
CN    EP 2757194 A3 * 10/2014  ......... B65D 43/0212
(Continued)

*Primary Examiner* — Jose Fortuna

(57) ABSTRACT

A method for preparing a pulp molded cup lid with buckles without overlapping curves on both surfaces, comprising: diluting plant fiber into pulp and placing it into a forming mold with a filter screen to form a paper embryo through vacuum adsorption; assembling the forming mold with a transfer mold under no pressure for vacuumization to obtain a paper embryo; transferring the paper embryo into a heat setting mold without mesh screen and assembling the mold under no pressure to obtain a cup lid body with stiffening ribs; then stamping into a finished cup lid. The cup lid has smooth internal and external surfaces without overlapping curves and no paper fiber dissolved out at the places where the internal surface and the liquid contact and the suction port and the labial part of the user contact; buckles improves the strength of the cup lid and the leakproofness.

8 Claims, 4 Drawing Sheets

(52) U.S. Cl.
CPC .............. *B65D 2543/00046* (2013.01); *B65D 2543/00092* (2013.01); *B65D 2543/00268* (2013.01); *B65D 2543/00537* (2013.01); *B65D 2543/00731* (2013.01); *B65D 2543/00805* (2013.01); *Y02W 90/11* (2015.05)

(58) Field of Classification Search
CPC ........... B65D 2543/00092; B65D 2543/00268; B65D 2543/00537; B65D 2543/00731; B65D 2543/00805; B65D 43/02; B65D 43/0212

See application file for complete search history.

(56) References Cited

U.S. PATENT DOCUMENTS

| | | | | |
|---|---|---|---|---|
| 8,613,612 | B2* | 12/2013 | Middleton | B29C 45/14336 425/112 |
| 8,870,015 | B1* | 10/2014 | LaMasney | B65D 1/34 220/324 |
| 2003/0111201 | A1* | 6/2003 | Sato | D21J 3/10 162/382 |
| 2005/0150624 | A1* | 7/2005 | Toh | D21B 1/00 162/218 |
| 2009/0283526 | A1* | 11/2009 | Pierce | A47G 19/22 220/254.7 |
| 2010/0294448 | A1* | 11/2010 | Pierce | D21J 3/10 162/224 |
| 2011/0011549 | A1* | 1/2011 | Pierce | D21J 3/10 162/227 |
| 2011/0139800 | A1* | 6/2011 | Urban | B65D 43/0212 220/713 |
| 2011/0233209 | A1* | 9/2011 | Tu | B65D 43/0208 220/254.1 |
| 2014/0048552 | A1* | 2/2014 | Wang | D21J 3/00 220/780 |
| 2014/0167302 | A1* | 6/2014 | Urban | B65D 43/0212 264/40.1 |
| 2014/0374953 | A1* | 12/2014 | Middleton | B29C 45/14336 264/275 |
| 2015/0308050 | A1* | 10/2015 | Corbett | D21J 3/10 162/218 |
| 2016/0016702 | A1* | 1/2016 | Siskindovich | B65D 43/0208 220/315 |
| 2016/0168793 | A1* | 6/2016 | Kuo | D21J 3/12 162/227 |
| 2016/0168801 | A1* | 6/2016 | Kuo | D21J 3/00 162/194 |
| 2016/0319490 | A1* | 11/2016 | Wang | D21J 7/00 |
| 2016/0362845 | A1* | 12/2016 | Kuo | D21H 1/18 |
| 2017/0029191 | A1* | 2/2017 | Corbett | B65D 25/18 |

FOREIGN PATENT DOCUMENTS

| | | | | |
|---|---|---|---|---|
| GB | 1021976 A | * | 3/1966 | ................ D21J 7/00 |
| JP | 2007039093 A | * | 2/2007 | |
| JP | 3165080 U | * | 1/2011 | ......... B65D 43/0208 |
| SG | WO 03074789 A1 | * | 9/2003 | ................ D21B 1/00 |
| WO | WO 2009132318 A1 | * | 10/2009 | ............. A47G 19/22 |
| WO | WO 2010124300 A1 | * | 10/2010 | ................ D21J 3/10 |

\* cited by examiner

METHOD FOR PREPARING A PULP MOLDED CUP LID WITH BUCKLES WITHOUT OVERLAPPING CURVES ON BOTH SURFACES

CROSS-REFERENCE TO RELATED APPLICATIONS

The present application is a Continuation-in-Part application of U.S. patent application Ser. No. 13/970,588 filed on Aug. 19, 2013, now abandoned, which claims the benefit of PCT application No. PCT/CN2013/070512 filed on Jan. 16, 2013 and Chinese Patent Application No. 201220410099.9 filed on Aug. 17, 2012, the contents of which are hereby incorporated by reference.

TECHNICAL FIELD

The invention relates to the field of pulp molded cup lid manufacturing and particularly relates to a method for preparing a pulp molded cup lid with buckles without overlapping curves on both surfaces.

BACKGROUND

As a three-dimensional paper making technology, pulp molding is to mold paper products of certain shapes with molds in a pulp molding machine with the raw material as pulp or plant fiber.

One traditional production process for manufacturing pulp molded products includes the steps of: diluting plant fiber into pulp and placing it into a forming mold with a filter screen to form a paper embryo with a moisture content of 68-75% by mass percent through vacuum adsorption; reducing the moisture content to 10-15% through drying processes as drying in the sun, air drying or stoving, and placing it into a heat setting mold of 160-180° C. for reshaping through pressurizing. In this process, the product is almost dried and shaped in the stage of drying and has a density of 0.35-0.40 $g/cm^3$ with obvious overlapping curves on both surfaces after reshaping through pressurizing; therefore, the method is often used for producing the packing material having a requirement for buffering rather than appearance.

Another traditional production process for manufacturing pulp molded products includes the steps of: diluting plant fiber into pulp and placing it into a forming mold with a filter screen to form a paper embryo with a moisture content of 68-75% by mass percent through vacuum adsorption; transferring the wet paper embryo into a heat setting mold with metal mesh screen for direct pressurizing, drying and molding. With a density of 0.6-0.65 $g/cm^3$, the product of the method has one surface smooth and the other surface with obvious overlapping curves; the molded pulp packaging products and pulp molded cup lids on current market are produced by this process. Without effective press polishing, tiny plant fibers on the surface with overlapping curves are easy to be dissolved out; moreover, as molded in the mold with steel mesh screen, the deciduous tiny steel wires are easy to be pressed into the product, thus scraping the product and increasing the difficulty of production inspection.

The pulp molded cup lids in prior art are also produced through the processes as pulp diluting, vacuum adsorption molding, pressurizing, drying and molding under high temperature, edge trimming, suction port stamping, sealing edge stamping or annular trench rolling, etc., having one surface smooth and the other surface with obvious overlapping curves with a density of 0.6-0.65 $g/cm^3$ as well. However, for aesthetic reason, the surface without overlapping curves is normally designed as the external surface of the cup lid and the other surface with overlapping curves as the internal surface; therefore, the dissolved plant fibers along with undetected steel wires may fall into the drinks, which is unacceptable for customers; in case the surface with overlapping curves is designed as the external surface of the cup lid, it will also be unacceptable for customers to swallow tiny plant fibers when their lips contact the surface with overlapping curves while drinking besides the unpleasant appearance of the product and non-moldability of literals and patterns.

Meanwhile, the density of the pulp molded cup lid in prior art is 0.6-0.65 $g/cm^3$ for its forming with mesh screen, therefore, the using effect may be affected because the cup lid is likely damped and softened when contacting the hot drinks. Especially because of insufficient density of the sealing edge and no buckles, the cup lid and the cup rim cannot be connected and clasped and thus fail to achieve favorable sealing ability; when holding hot or cold drinks, the cup is easy to depart from the lid without buckles due to limited opening frequency and exogenic action and then scalds the user; the lid without buckles can no longer fit the cup rim tightly as the limited frequency is exceeded; the existing cup lid without stiffening ribs at the suction port side has low strength at the suction port, therefore, the suction port is likely to be softened and deformed when immersed by liquid especially the hot drinks and under the exogenic action applied by the labial part of the user.

SUMMARY OF THE INVENTION

The technical problem to be solved by the invention is to provide a method for preparing a pulp molded cup lid with buckles without overlapping curves on both surfaces, to solve the problems in prior art that obvious overlapping curves exist on surfaces due to mold pressing with mesh screen; plant fibers are easy to be dissolved out from the surface pressed with mesh screen; the sealing ability with the cup rim is poor due to low density and no buckles; and the overall strength of the cup lid is insufficient.

The above technical problems are mainly solved through the following technical schemes of the invention:

A method for preparing a pulp molded cup lid with buckles without overlapping curves on both surfaces, comprising the following steps of:

a. diluting plant fiber into pulp with a concentration of 0.3-0.5%;

b. placing the pulp described in Step a into a forming mold with a filter screen of 40-50 meshes to form a paper embryo with a moisture content of 65-75% by mass percent through vacuum adsorption;

c. assembling the forming mold containing the paper embryo described in Step b with a transfer mold of 120-200° C. under no pressure for vacuumization for 2-7 s; then increasing the mold clamping pressure to 27-40 $N/cm^2$ for 3-15 s to obtain a paper embryo with a moisture content of 50-58% by mass percent; the moisture content of the surface of the paper embryo in contact with the filter screen is 55-65% by mass percent;

d. transferring the paper embryo obtained in Step c into a heat setting mold without mesh screen, of which the upper mold and lower mold are both of 160-205° C.; and assembling the mold under no pressure for 2-8 s; then increasing the mold clamping pressure to 70-120 $N/cm^2$ for 20-45 s to obtain a cup lid body with a density of 0.75-0.8 $g/cm^3$ with a boss, a sealing edge, a groove and the concave-convex stiffening ribs arranged at the suction port side;

e. placing the cup lid body obtained in Step d into a buckle die, of which the edge is circumferentially arranged with a plurality of sliding blocks with buckle-shaped concave or convex dies; the inner side of the sliding blocks is arranged with elastic components; stamping the cup lid body with a the pressure of 50-80 N/mm to form 8-16 evenly spaced buckles with inward convex circumferentially arranged at the inner side of the sealing edge; the length of the buckle is 10-25 mm and the depth of the inward convex of the buckle is 1.5-2.5 mm; the length of the buckle is less than the space between the two buckles;

f. processing the cup lid body obtained in Step e in a cutting die to trim the edge of the cup lid body and form a suction port and a vent on the cup lid body.

Preferably, the Step d is to directly assemble the transfer mold containing the paper embryo obtained in Step c with the lower mold without mesh screen with the temperature of 160-205° C. under no pressure for 2-8 s; then increase the mold clamping pressure to 70-120 N/cm² for 20-45 s to obtain a cup lid body with a density of 0.75-0.8 g/cm³ with a boss, a sealing edge, a groove and the concave-convex stiffening ribs arranged at the suction port side.

Preferably, the moisture content of the paper embryo formed in Step b is 70% by mass percent.

Preferably, the temperature of the transfer mold in the Step c is 170° C. and the duration for mold clamping under no pressure is 3 s; then the mold clamping pressure is increased to 33 N/cm² for 6 s; the total moisture content of the paper embryo is 57% by mass percent; the moisture content of the surface of the paper embryo in contact with the filter screen is 60% by mass percent.

Preferably, the temperature of the upper and lower molds in the Step d is 170° C.; the duration for mold clamping under no pressure is 3 s; then the mold clamping pressure is increased to 97 N/cm² for 30 s.

The beneficial effects of the invention are that: the cup lid out of the above technical schemes has smooth internal and external surfaces without overlapping curves and no paper fiber dissolved out at the places where the internal surface and the liquid contact and the suction port and the labial part of the user contact; meanwhile, the paper fibers of the cup lid are bonded tightly with a thickness of 0.45 mm-0.60 mm, the density of the cup lid reaches 0.77 g/cm³-0.8 g/cm³, thus the overall strength and stiffness of the cup lid, especially the strength of the buckles, are improved, making the cup lid and the cup rim tightly clasped all the time under certain exogenic action and the whole cup lid not damped or deformed even in humid environment.

DETAILED DESCRIPTION OF THE PREFERRED EMBODIMENT

The invention is further described in combination with drawings and embodiments as follows. It shall be noted that, the description of these embodiments is to provide further understanding of the invention, but not to form a restriction therefore. Moreover, the technical features related to the embodiments of the invention described as follows can combine with each other when they don't conflict with each other.

Figure 1:
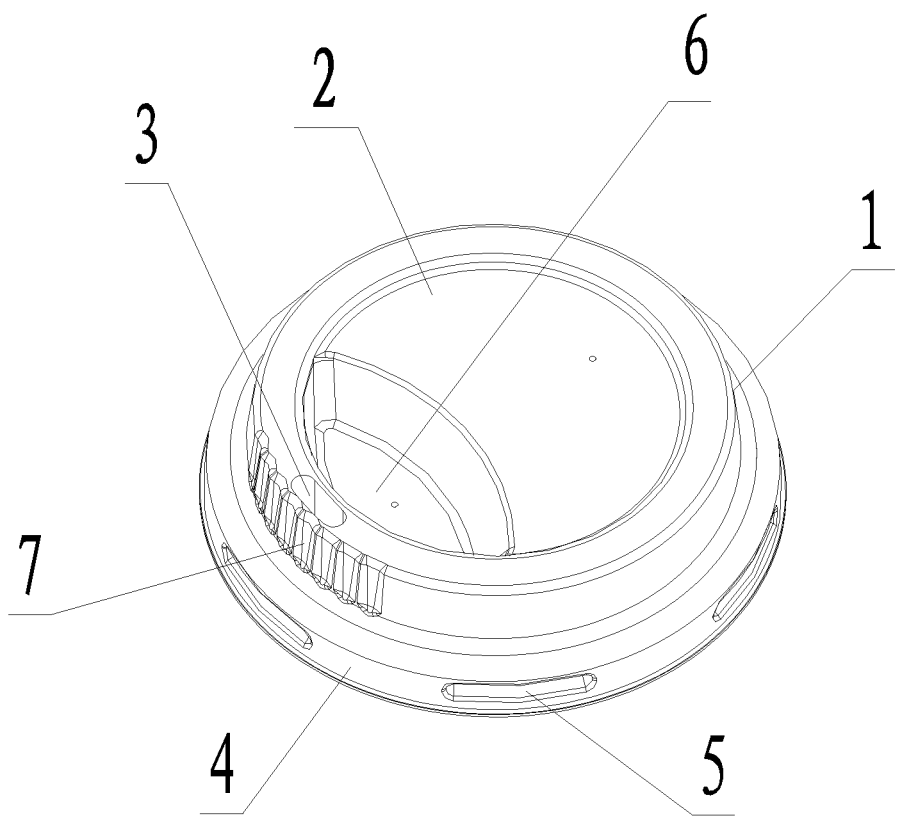
FIG. 1 is a stereogram of the cup lid of the invention.
Figure 2:
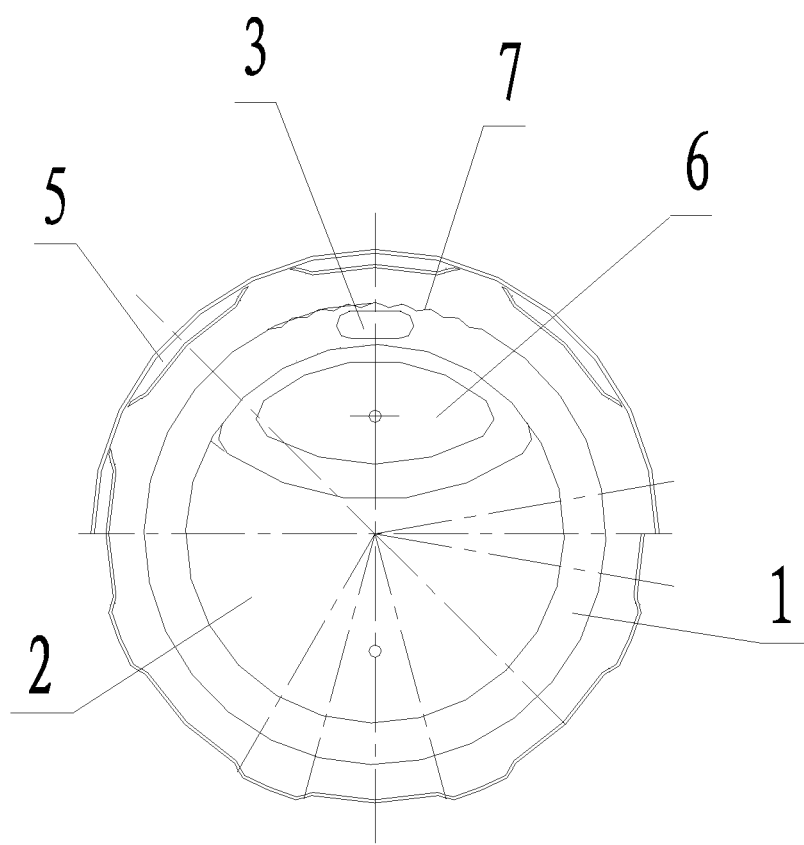
FIG. 2 is a top view of the cup lid of the invention.
Figure 3:
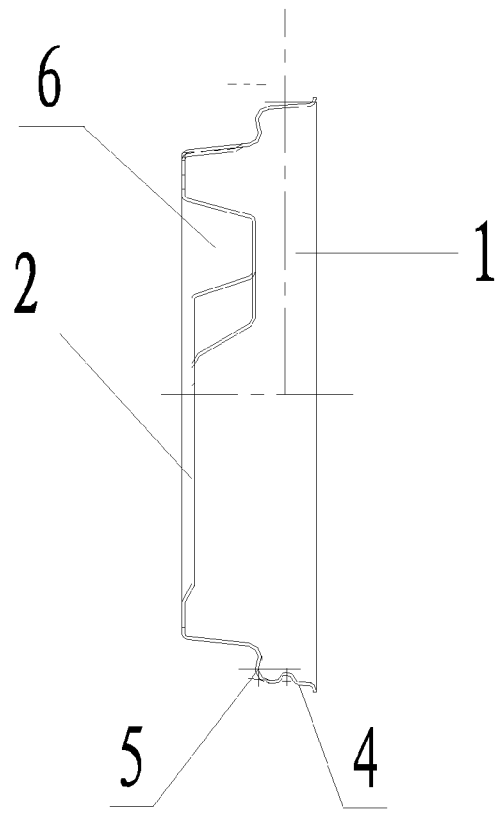
FIG. 3 is a section view of the cup lid of the invention.
Figure 4:
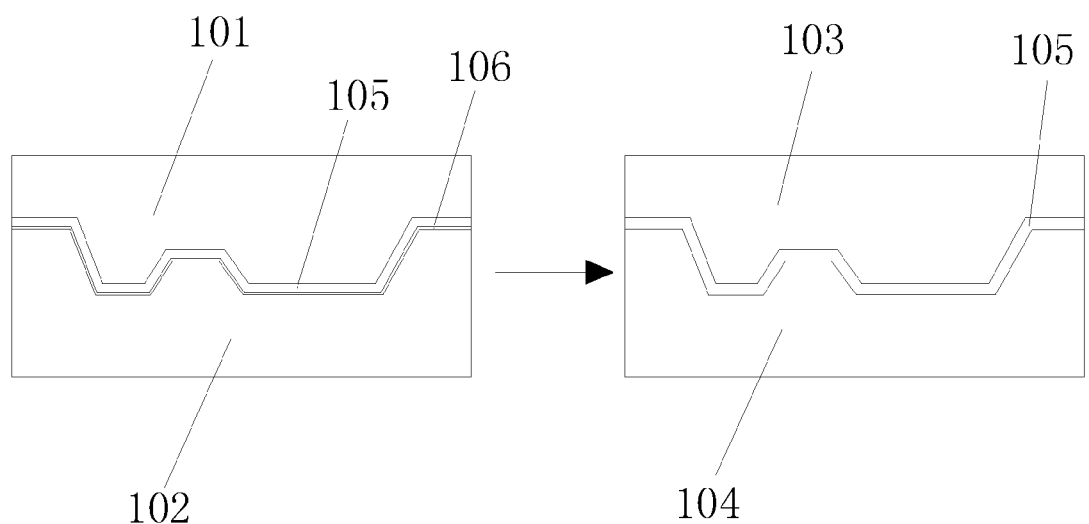
FIG. 4 is a schematic diagram of the formation process of the cup lid body with stiffening ribs of the invention.
Figure 5:
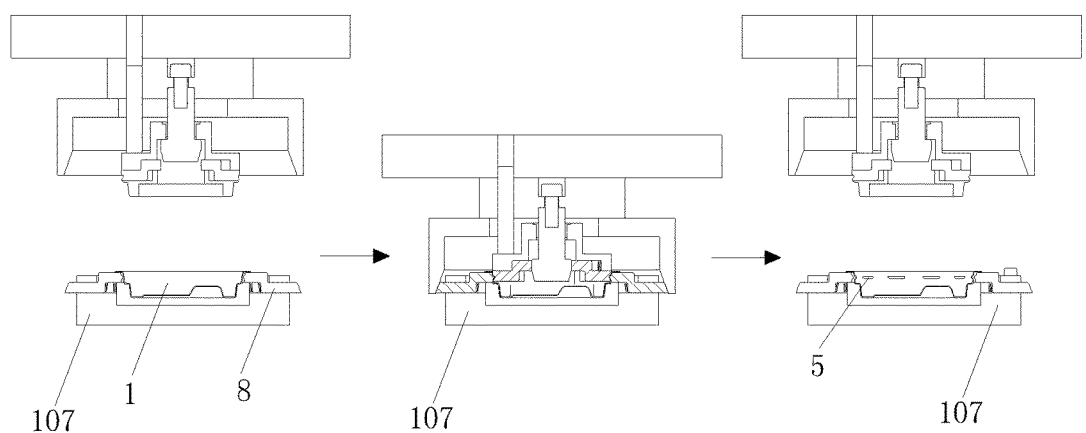
FIG. 5 is a schematic diagram of the formation process of the buckles.

As shown in FIGS. 1-5, a method for preparing a pulp molded cup lid with buckles without overlapping curves on both surfaces, comprising the following steps of:

a. diluting plant fiber into pulp with a concentration of 0.3-0.5%;

b. placing the pulp prepared in Step a into a forming mold 102 with a filter screen 106 of 40-50 meshes to form a paper embryo 105 with a moisture content of 65-75% by mass percent through vacuum adsorption;

c. assembling the forming mold 102 containing the paper embryo 105 described in Step b with a transfer mold 101 of 120-200° C. under no pressure for vacuumization for 2-7 s; then increasing the mold clamping pressure to 27-40 N/cm² for 3-15 s to obtain a paper embryo 105 with a moisture content of 50-58% of the mass; the moisture content of the surface of the paper embryo 105 in contact with the filter screen 106 is 55-58% by mass percent;

d. transferring the paper embryo 105 obtained in Step c into a heat setting mold without mesh screen, of which the upper mold 103 and lower mold 104 are both of 160-205° C.; and assembling the mold under no pressure for 2-8 s; then increasing the mold clamping pressure to 70-120 N/cm² for 20-45 s to obtain a cup lid body 1 with a density of 0.75-0.8 g/cm³ with a boss 2, a sealing edge 4, a groove 6 and stiffening ribs 7;

e. placing the cup lid body 1 obtained in Step d into a buckle die 107, of which the edge is circumferentially arranged with a plurality of sliding blocks 8 with buckle-shaped concave or convex dies; the inner side of the buckle 8 is arranged with elastic components; stamping the cup lid body 1 with a pressure of 50-80 N/mm to form 8-16 evenly spaced buckles 5 with inward convex circumferentially arranged at the inner side of the sealing edge 4; the length of the buckle 5 is 10-25 mm and the depth of the inward convex of the buckle 5 is 1.5-2.5 mm; the length of the buckle 5 is less than the space between the two buckles 5;

f. processing the cup lid body 1 obtained in Step e in a cutting die to trim the edge of the cup lid body 1 and form a suction port 3 and a vent on the cup lid body 1.

Through Step c, one surface of the paper embryo 105 near the transfer mold 101 is heated to shrink slightly, which improves the strength of the surface fiber texture and thus prevents the paper embryo from being fractured due to sudden increase of the mold clamping pressure; then the water is squeezed out of the paper embryo 105 by increasing the mold clamping pressure and the surface of the paper embryo 105 which is not exposed to the filter screen is pre-dried through transfer mold 101. The moisture content of both surfaces of the paper embryo 105 is different because only one surface of the paper embryo 105 is heated; in case the moisture content of the surface that contacts the filter screen 106 is too low, the overlapping curves of the filter screen 106 will be printed onto the paper embryo 105; in case the moisture content is too high, the cup lid product will be layered or the embryo will explode in the mold in the process of high-temperature pressing without filter screen due to the large amount of steam and pressure generated between the paper embryo 105 and the mold, and thus become a waste.

Through Step d, the paper embryo 105 is pre-dried in the automatic single-side-opened paper molding machine, thus the plant fiber in the paper embryo 105 has enough strength to absorb on the paper embryo 105, from which much moisture is removed through squeezing and pre-drying; therefore, there is no need to block the plant fibers or filter moisture with the filter screen 106 during heat setting and drying of the paper embryo in this step, and thus, no overlapping curves will be formed on the surfaces of the final cup lid, and the pulp molded cup lid with buckles without overlapping curves on both surfaces is produced. Meanwhile, without filter screen 106, the mold clamping pressure can be increased to 70-120 N/cm$^2$ to improve the density of the paper embryo 105; a groove 6 is arranged at the place near the suction port 3 on the cup lid body 1, which fully exposes the suction port 3 and making it easier for users to drink from the suction port 3 and reducing the dependence on straws; the stiffening ribs 7 arranged at the external side of the suction port 3 improves the overall strength of the cup lid and makes suction port 3 remain firm and non-deformable when immersed by drinks or under the exogenic action applied by lips while drinking; not only with the structure of concave and convex-shaped arrangement, the stiffening ribs 7 with the structure of folded- or corrugated-shaped arrangement may also improve the strength of the cup lid.

Through Step e, the evenly spaced buckles 5 with inward convex circumferentially arranged at the edge of the cup lid body 1 are stamped with interval under a certain pressure; the buckle 5 is strip- or arc-shaped with a length less than the space between two buckles 5 for easy demolding after the formation of the cup lid buckles of different shapes; the interval arrangement of the buckles will not damage the bonding strength of the epitaxial pulp fiber of the pulp cup lid, but will enhance the leakproofness between the cup lid body 1 and the cup; under exogenic action, the cup lid body 1 will neither fall off from the cup nor become deformable after being opened repeatedly; the buckles 5 makes the cup lid body 1 and cup rim clasped tightly, and favorably maintains and improves the overall strength and stiffness of the sealing edge 4.

Through Step f, the cup lid body 1 can be trimmed around the edge to improve the aesthetics of the product; moreover, a suction port 3 and a vent are formed on the cup lid body 1; the suction port 3 replaces the use of straw, while the vent may supplement the cup with air during drinking, maintaining the air pressure in the cup timely, ensuring the drinks to be sucked smoothly and preventing the cup from be deformed due to the suction force.

The cup lid of the above manufacturing method has smooth internal and external surfaces without overlapping curves and no paper fibers dissolved out at the places where the internal surface and the liquid contact and the suction port and the labial part of the user contact; the proper cooperation between the production process, the equipment and the mold ensures that the moisture content of each surface of the paper embryo 105 is properly different during mold assembling, drying and forming of the upper mold 103 and the lower mold 104 under high temperature pressure; with a higher pressure than that in normally pulp molding process, the formed cup lid body 1 has no overlapping curves on both surfaces; the fibers of the cup lid body 1 are bonded closely and the density of the cup lid body 1 reaches 0.77-0.8 g/cm$^3$; the improvement of the overall strength and stiffness, especially the design of buckles 5 and the length and quantity of the buckles 5 can not only improve the leakproofness between the cup lid body 1 and the cup, but also prevent the cup lid body 1 from being deformed to affect the leakproofness during repeated use; moreover, the cup lid will not be damped and deformed in humid environment.

Embodiment 1

Preferably, in the automatic double-side-opened paper molding machine, the Step d is to directly assemble the transfer mold 101 containing the paper embryo 105 obtained in Step c with the lower mold 104 without mesh screen with the temperature of 160-205° C. under no pressure for 2-8 s; then increase the mold clamping pressure to 70-120 N/cm$^2$ for 20-45 s to obtain a cup lid body 1 with a density of 0.75-0.8 g/cm$^3$ with a boss 2, a sealing edge 4, a groove 6 and stiffening ribs 7.

In the above scheme, the transfer mold 101 is directly assembled with the lower mole 104 and the step of taking the paper embryo out of the mold 101 and placing it to the upper mold 103 is omitted, therefore it saves the cost of molds and improves the percent of pass of the product.

Embodiment 2

Preferably, the moisture content of the paper embryo formed in Step b is 70% by mass percent.

Embodiment 3

Preferably, the temperature of the transfer mold 101 in the Step c is 170° C. and the duration for mold clamping under no pressure is 3 s; then the mold clamping pressure is increased to 33 N/cm$^2$ for 6 s; the total moisture content of the paper embryo 105 is 57% by mass percent; the moisture content of the surface of the paper embryo 105 in contact with the filter screen 106 is 60% by mass percent.

Embodiment 4

Preferably, the temperature of the upper and lower molds in the Step d is 170° C.; the duration for mold clamping under no pressure is 3 s; then the mold clamping pressure is increased to 97 N/cm$^2$ for 30 s.

The structure of the pulp molded cup lid with buckles without overlapping curves on both surfaces is not limited to that showed in the drawings.

The above is a detailed description for the embodiments of the invention in combination with drawings, but the invention is not limited to the embodiments described above. For a person skilled in the art, various changes and amendments, replacements and deformations made under the premise of not departing from the spirit and essence of the invention still fall within the protection scope of the invention.

What is claimed is:

1. A method for preparing a pulp molded cup lid with buckles without overlapping curves on both surfaces, comprising the following steps of:
   a, diluting plant fiber into pulp with a concentration of 0.3-0.5%;
   b, placing the pulp prepared in step a into a forming mold (102) with a filter screen (106) of 40-50 meshes to form a paper embryo (105) with a moisture content of 65-75% by mass through vacuum adsorption;
   c, assembling the forming mold (102) containing the paper embryo (105) described in step b with a transfer mold (101) of 120-200° C. under no pressure and taking a vacuum for 2-7 s; then increasing the mold clamping pressure to 27-40 N/cm² for 3-15 s to obtain a paper embryo (105) with a moisture content of 50-58% by mass; the moisture content of the surface of the paper embryo (105) in contact with the filter screen (106) is 55-65% by mass;

d, transferring the paper embryo (105) obtained in step c into a heat setting mold without mesh screen, of which both the upper mold (103) and lower mold (104) have a temperature of 160-205° C.; and assembling the mold under no pressure for 2-8 s; then increasing the mold clamping pressure to 70-120 N/cm² for 20-45 s to obtain a cup lid body (1) with a density of 0.75-0.8 g/cm³ with a boss (2), a sealing edge (4), a groove (6) and the concave-convex stiffening ribs (7) arranged at a suction port side;

e, placing the cup lid body (1) obtained in step d into a buckle die (107), of which the edge is circumferentially arranged with a plurality of sliding blocks (8) with buckle-shaped concave or convex dies; the inner side of the sliding blocks (8) is arranged with elastic components; stamping the cup lid body (1) with a pressure of 50-80 N/mm to form 8-16 evenly spaced buckles (5) with inward convex circumferentially arranged at the inner side of the sealing edge (4); the length of the buckles (5) are 10-25 mm and the depth of the inward convex of the buckles (5) are 1.5-2.5 mm; the length of the buckles (5) are less than the space between two buckles (5);

f, processing the cup lid body (1) obtained in step e in a cutting die to trim the edge of the cup lid body (1) and form a suction port (3) and a vent on the cup lid body (1).

2. The method for preparing a pulp molded cup lid with buckles without overlapping curves on both surfaces according to claim 1, wherein, the step d is assembling the transfer mold (101) containing the paper embryo (105) obtained in step c with the lower mold (104) without mesh screen with the temperature of 160-205° C. under no pressure for 2-8 s; then increase the mold clamping pressure to 70-120 N/cm² for 20-45 s to obtain a cup lid body (1) with a density of 0.75-0.8 g/cm³ with a boss (2), a sealing edge (4), a groove (6) and the concave-convex stiffening ribs (7) arranged at the suction port side.

3. The method for preparing a pulp molded cup lid with buckles without overlapping curves on both surfaces according to claim 2, wherein, the moisture content of the paper embryo (105) formed in step b is 70% by mass.

4. The method for preparing a pulp molded cup lid with buckles without overlapping curves on both surfaces according to claim 2, wherein, the temperature of the transfer mold (101) in the step c is 170° C. and the duration for mold clamping under no pressure is 3 s; then the mold clamping pressure is increased to 33 N/cm² for 6 s; the total moisture content of the paper embryo (105) is 57% by mass; the moisture content of the surface of the paper embryo (105) in contact with the filter screen (106) is 60% by mass.

5. The method for preparing a pulp molded cup lid with buckles without overlapping curves on both surfaces according to claim 2, wherein, the temperature of the upper molds (103) and lower mold (104) in the step d is 170° C.; the duration for mold clamping under no pressure is 3 s; then the mold clamping pressure is increased to 97 N/cm² for 30 s.

6. The method for preparing a pulp molded cup lid with buckles without overlapping curves on both surfaces according to claim 1, wherein, the moisture content of the paper embryo (105) formed in step b is 70% by mass.

7. The method for preparing a pulp molded cup lid with buckles without overlapping curves on both surfaces according to claim 1, wherein, the temperature of the transfer mold (101) in the step c is 170° C. and the duration for mold clamping under no pressure is 3 s; then the mold clamping pressure is increased to 33 N/cm² for 6 s; the total moisture content of the paper embryo (105) is 57% by mass; the moisture content of the surface of the paper embryo (105) in contact with the filter screen (106) is 60% by mass.

8. The method for preparing a pulp molded cup lid with buckles without overlapping curves on both surfaces according to claim 1, wherein, the temperature of the upper molds (103) and lower mold (104) in the step d is 170° C.; the duration for mold clamping under no pressure is 3 s; then the mold clamping pressure is increased to 97 N/cm² for 30 s.

* * * * *